No. 673,171. Patented Apr. 30, 1901.
F. J. MAYER.
APPARATUS FOR EXTRACTING TAR FROM COAL GAS.
(Application filed Dec. 20, 1900.)

(No Model.) 6 Sheets—Sheet 1.

No. 673,171. Patented Apr. 30, 1901.
F. J. MAYER.
APPARATUS FOR EXTRACTING TAR FROM COAL GAS.
(Application filed Dec. 20, 1900.)
(No Model.) 6 Sheets—Sheet 2.

WITNESSES: INVENTOR:

No. 673,171. Patented Apr. 30, 1901.
F. J. MAYER.
APPARATUS FOR EXTRACTING TAR FROM COAL GAS.
(Application filed Dec. 20, 1900.)
(No Model.) 6 Sheets—Sheet 3.

WITNESSES:

INVENTOR:
Frederick J. Mayer,
by Geo. W. J. Howard,
atty.

No. 673,171. Patented Apr. 30, 1901.
F. J. MAYER.
APPARATUS FOR EXTRACTING TAR FROM COAL GAS.
(Application filed Dec. 20, 1900.)
(No Model.) 6 Sheets—Sheet 4.

WITNESSES: INVENTOR:
Frederick J. Mayer,
by W. T. Howard,
atty.

No. 673,171. Patented Apr. 30, 1901.
F. J. MAYER.
APPARATUS FOR EXTRACTING TAR FROM COAL GAS.
(Application filed Dec. 20, 1900.)
(No Model.) 6 Sheets—Sheet 5.

No. 673,171. Patented Apr. 30, 1901.
F. J. MAYER.
APPARATUS FOR EXTRACTING TAR FROM COAL GAS.
(Application filed Dec. 20, 1900.)
(No Model.) 6 Sheets—Sheet 6.
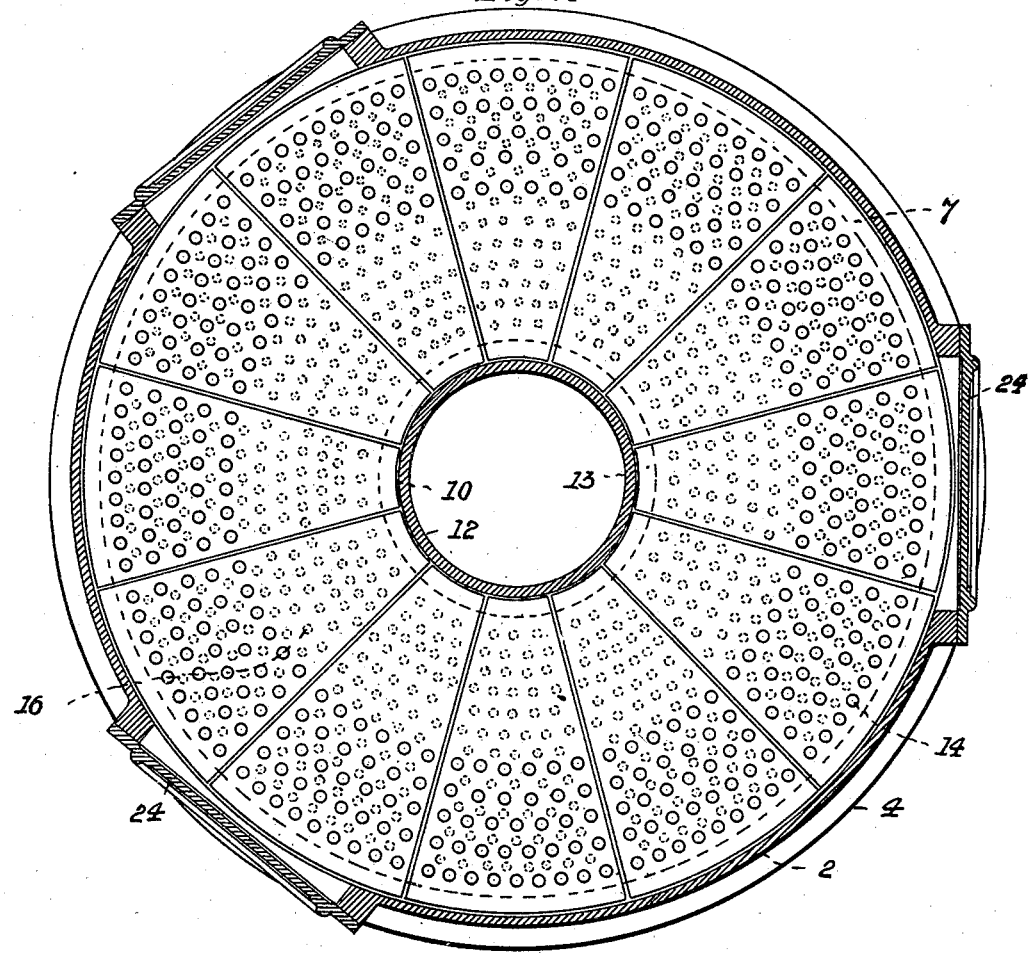
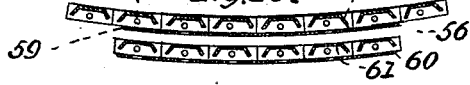
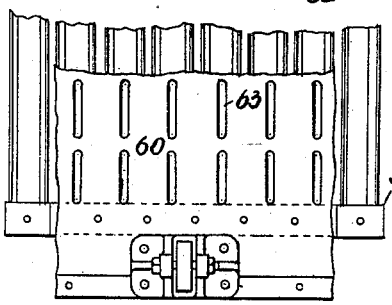

UNITED STATES PATENT OFFICE.

FREDERICK J. MAYER, OF BALTIMORE, MARYLAND.

APPARATUS FOR EXTRACTING TAR FROM COAL-GAS.

SPECIFICATION forming part of Letters Patent No. 673,171, dated April 30, 1901.

Application filed December 20, 1900. Serial No. 40,482. (No model.)

*To all whom it may concern:*

Be it known that I, FREDERICK J. MAYER, of the city of Baltimore, in the State of Maryland, have invented certain Improvements in Apparatus for Extracting Tar from Coal-Gas and for Strengthening the Ammoniacal Liquor Used in the Process, of which the following is a specification.

In the description of the said invention which follows reference is made to the accompanying drawings, forming a part hereof, and in which—

Figure 1:
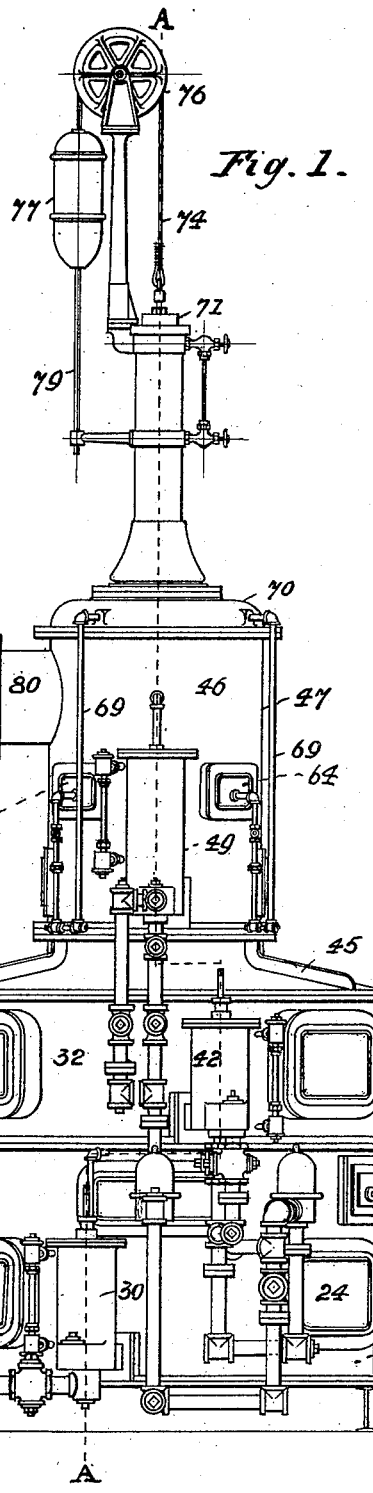
Figure 2:
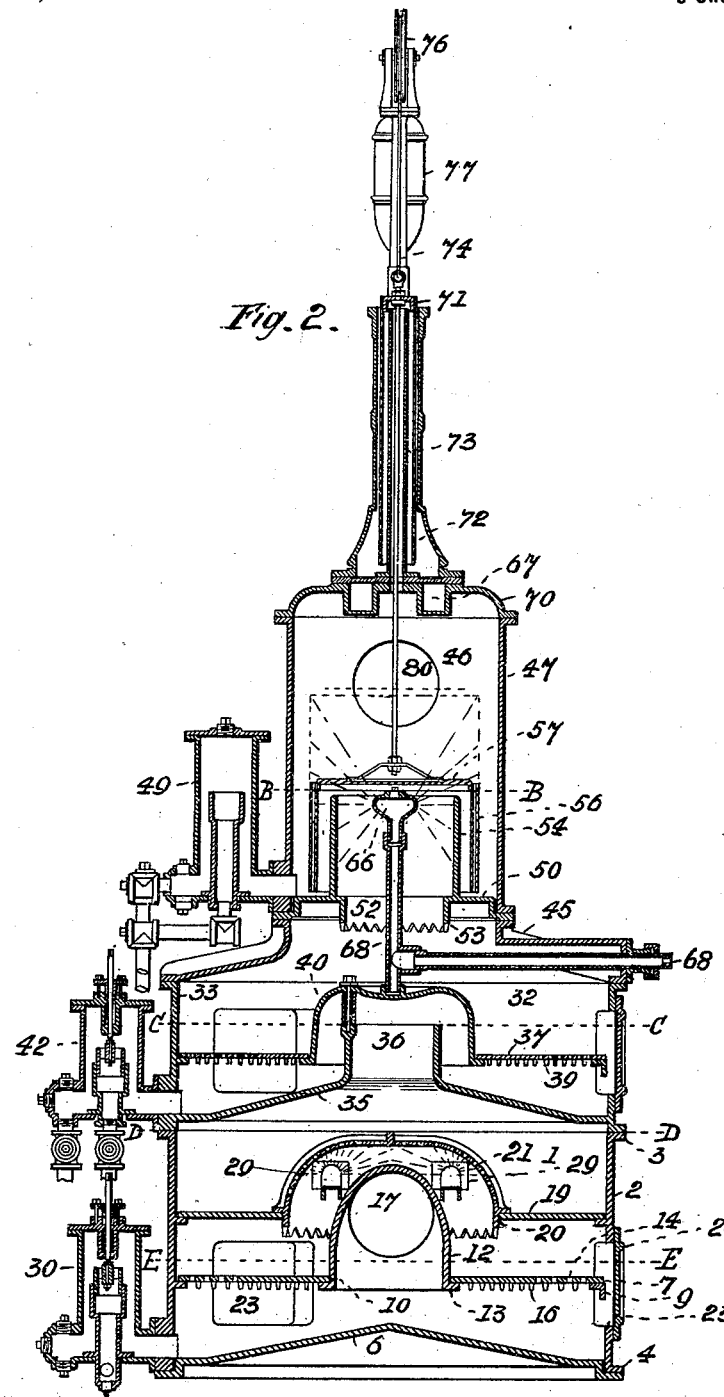
Figure 3:
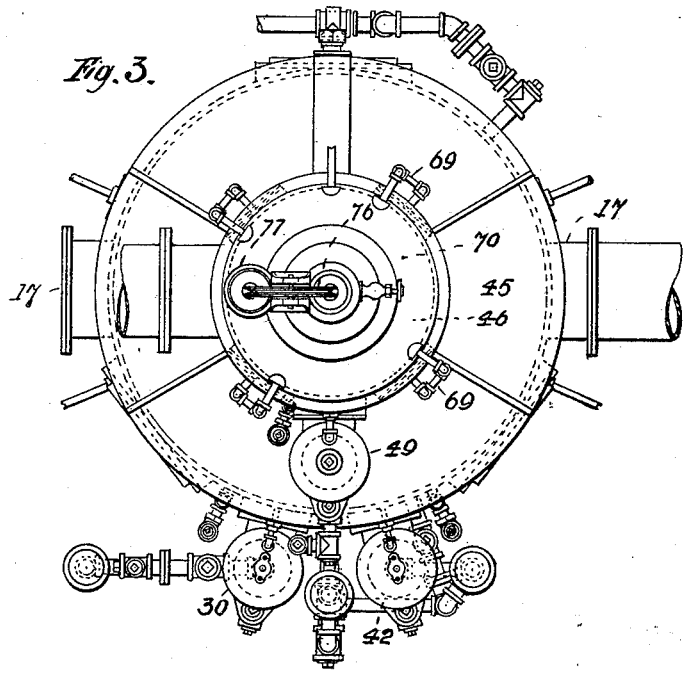
Figure 4:
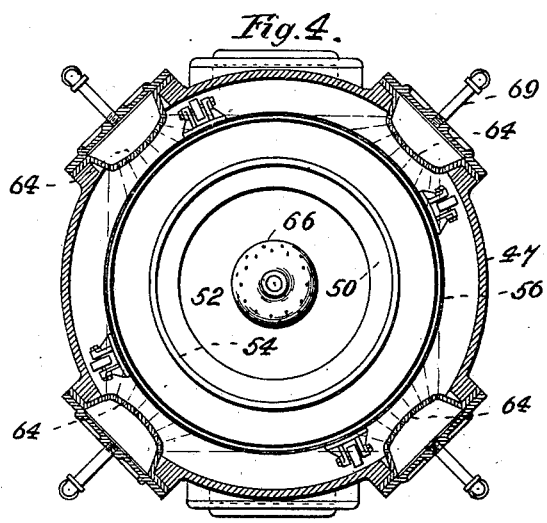
Figure 5:
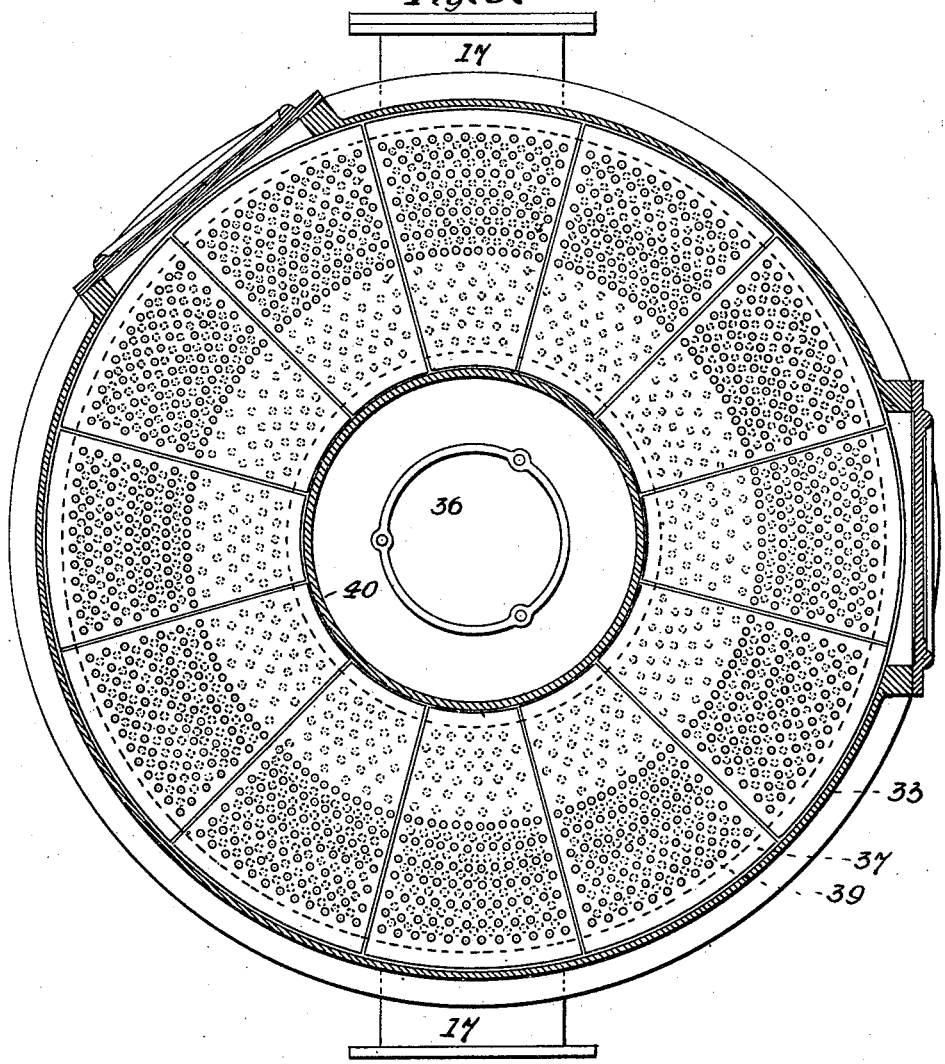
Figure 8:
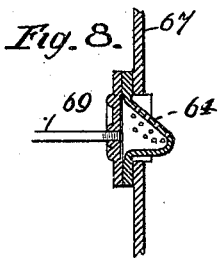
Figure 6:
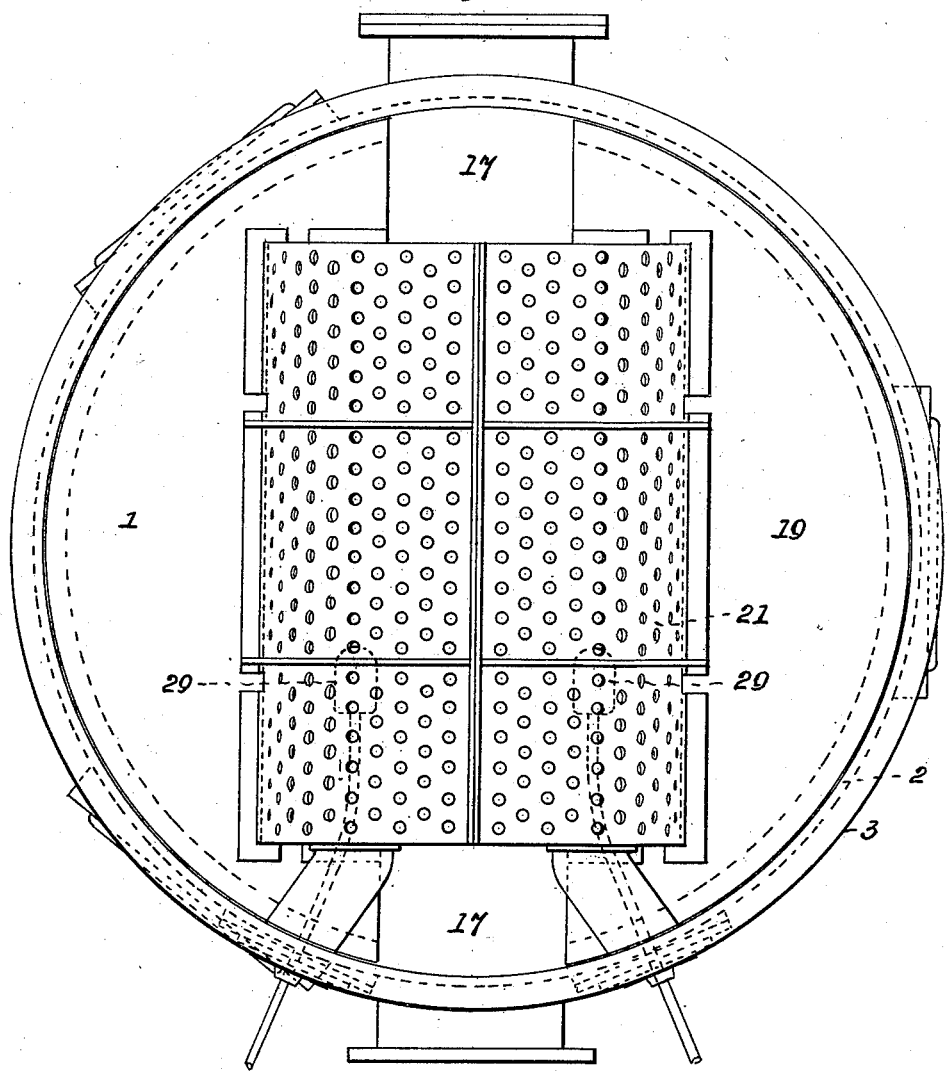
Figure 9:
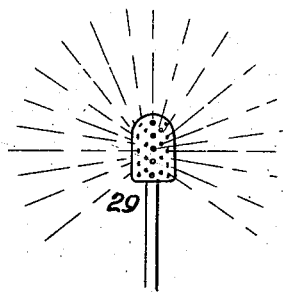

Figure 1 is an exterior elevation of the improved apparatus. Fig. 2 is a section of Fig. 1, taken on the irregular dotted line A A. Fig. 3 is a plan of Fig. 1. Fig. 4 is an enlarged section of Fig. 2, taken on the dotted line B B. Fig. 5 is an enlarged section of Fig. 2, taken on the dotted line C C. Fig. 6 is an enlarged section of Fig. 2, taken on the dotted line D D. Fig. 7 is an enlarged section of Fig. 1, taken on the dotted line E E. Figs. 8, 9, 10, 11, and 12 are enlarged details of the apparatus.

Referring now to the drawings, 1 is the lower washer, consisting of the shell 2, having a flange 3 at the top, whereby it is attached to the upper washer, hereinafter described. At the bottom of the shell 2 is another flange 4, to which is secured the bottom 6, of conical form.

7 is a circular plate, a top view of which is shown in Fig. 7, supported by the flange 9. This plate is formed in segmental sections and has a central hole 10, through which is inserted from the bottom the dome 12, having the flange 13, whereby it is secured to the said plate. The said plate is provided with perforations 14 and a system of small projections 16 on its under side. Extending laterally from the dome 12 are the ducts 17, either or both of which may be used for the ingress of the impure or tar-laden gas. These ducts are well shown in Fig. 6.

19 is another plate, situated within the shell
2, supported, like the one 7, by a suitable flange. This second plate, which is imperforate, has a central quadrangular opening 20, in which is seated the perforated hood 21, covering the dome 12. The lower edge of this hood extends through the plate 19 and is serrated to produce drip-points for a purpose hereinafter described.

23 23 are manholes, three in number, in the shell 2, covered by the plates 24.

29 29 are sprayers, two of which are shown, situated in the hood 21, and they are supplied with weak ammoniacal liquor from any convenient source.

30 is an adjustable overflow-valve of common description, whereby the ammoniacal liquor at the bottom of the lower washer is retained at a proper and uniform height.

32 is the upper washer, which comprises the shell 33, the conical bottom 35, having the central nozzle 36 and the perforated annular plate 37, with the projections 39, similar to the plate 7, before described. The nozzle 36 is covered by the flanged dome 40, which is partially supported by the edge of the nozzle, as shown in Figs. 2 and 5. This upper washer has an overflow-valve 42, similar to the one 30 described in connection with the lower washer 1.

45 is a ribbed annular cover or head for the upper washer, having a flange to support the frictional condenser, which as an entirety is denoted by 46. The frictional condenser consists of a casing 47, with an overflow-valve 49, differing somewhat from the ones 30 and 42, before described, but of common construction.

50 is the lower head of the casing 47, consisting of a flanged annular plate interposed between the said casing and the upper washer. Around the central aperture 52 in the head 50 and dependent from the same is an annular flange 53, with a serrated edge to produce drip-points similar to those on the edge of the hood 21. The said head has also an upwardly-projecting cylindrical extension 54, covered by the bell 56. This bell consists of a head 57 and a cylindrical body. (See Figs. 10 and 11.) The body is formed of two concentric shells 59 and 60, united at the top by the head 57. On the inner surface of each of these shells are fastened the hollow strips 61, which are closed at the ends by being flattened, and the flattened portion of each, at the bottom, has a hole 62. The shells are provided with slots 63.

The casing 47 has sprinklers or sprayers 64. (See Figs. 1 and 4.) The sprinklers 64 throw spray against the exterior surface of the bell 56, as shown particularly in Fig. 4.

Within the cylindrical extension 54 is a sprayer 66 of the rose description, which sprays the inner surface of the cylinder and that of the bell. This sprayer is fed by means of the pipes 68, and the ones 64 derive their supply from the annular chamber 67 in the head 70 of the casing 47 by means of the pipes 69, (shown in Figs. 1 and 3,) which are formed so as to trap the liquor within them. The annular chamber, like the sprayer, is supplied with weak ammoniacal liquor from any convenient source, and a vessel (not shown) is provided to receive the said liquor as it is discharged from the overflow-valves of the apparatus. The bell is attached by a rod to the head of a sleeve 71, which slides vertically in a chamber 72, supplied with water to form, with the inner fixed sleeve 73, a liquid seal to prevent escape of gas.

74 is a cord leading from the head of the sleeve 71 over a pulley 76 to a counterbalancing-weight 77, which is guided by a rod 79. (Shown particularly in Fig. 1.)

80 is the outlet for the gas from the apparatus.

Supposing the tar-impregnated gas to be entering the apparatus through one or both of the inlet-ducts 17 and weak ammoniacal liquor under pressure to be passing through the various sprayers or sprinklers and the overflow-valves to be adjusted to give the required depth of the said liquor in the two washers and the frictional condenser, the operation of the apparatus is as follows: The gas on entering the dome 12 is forced to pass down through a body of ammoniacal liquor to below the plate 7, thence upward through the perforations in the said plate, and through the said liquor to the interior of the hood 21. In this movement of the gas the larger portion of the tar contained therein is washed out, and the surfaces of the said plate upon which tar is deposited are cleansed by the downward current of the ammoniacal liquor. In entering the hood the gas has to pass through the drip from the points on the lower edge of the hood, which forms a curtain, and when in the hood it is brought into contact with the spray from the sprinklers 29. The gas then escapes from the hood by means of the apertures in its crown and passes through the nozzle 36 to the second dome 40. It then takes a downward direction through the body of liquor in the upper washer and then an upward course through the said liquor and the perforated plate 37 and enters the cylinder 54 of the frictional condenser, passing through a second curtain formed by the drip from the points of the flange 53 and also through the spray from the sprinklers 66.

The vertical position of the bell 56 will depend entirely upon the pressure of the gas; but in all cases it will be somewhat elevated above that in which it is shown in Fig. 2.

The gas in escaping from the cylinder 54 passes over its edge and through the apertures in the portion of the bell which is above the liquid-line in the condenser and thence to the outlet 80.

From the foregoing description it will be understood that not only is the tar separated from the gas and the surfaces of the apparatus upon which the tar has been deposited cleansed by the sprays and the downward movement of the ammoniacal liquor, but the said liquor is strengthened by its contact with the gas, thus increasing the commercial value of that by-product.

I claim as my invention—

1. In a tar-extractor, a washer comprising a shell, a perforated plate supported within the shell having a central opening, an open-bottom dome situated within the central opening having an inlet for the unwashed gas which inlet is elevated above the said plate, combined with a second and imperforate plate having in the center thereof a perforated hood the lower edge of which is serrated and extends below the supporting-plate, and sprayers within the said hood adapted to cleanse the inner surface of the same, substantially as specified.

2. In a tar-extractor, a washer comprising a shell, a perforated plate situated within the shell having a central aperture therein, an open-bottom dome supported within the said central aperture having an inlet for unwashed gas which inlet is elevated above the said perforated plate, an imperforate plate situated above the perforated one, having at its center an open-bottom perforated hood, and spraying apparatus situated within the said hood, combined with a second washer comprising a bottom with a central nozzle, which is over the first washer, an annular perforated plate situated over the bottom, carrying an open-bottom imperforate dome, a cover or top for the second washer, and a frictional condenser in communication with the second washer, comprising a cylinder and bell, and spraying apparatus whereby the interiors of the said cylinder and bell, and the exterior surface of the said bell, are cleansed, substantially as specified.

3. In a frictional condenser forming a part of a tar-extractor, the cylinder and bell thereof combined with sprayers which play upon the inner surfaces of the said cylinder and bell, and the exterior surface of the bell, substantially as specified.

4. In a frictional condenser forming a part of a tar-extractor, the cylinder and bell thereof combined with sprayer situated within the same, whereby the inner surface of the said cylinder and bell are subjected to the action of spray and the surfaces thereof cleansed, substantially as specified.

FREDERICK J. MAYER.

Witnesses:
WM. T. HOWARD,
ESTEP T. GOTT.